(12) United States Patent
Baasch et al.

(10) Patent No.: US 7,793,749 B2
(45) Date of Patent: Sep. 14, 2010

(54) METHOD FOR OPERATING A DRIVE TRAIN OF A VEHICLE

(75) Inventors: Detlef Baasch, Ailingen (DE); Thomas Rosemeier, Mechenbeuren (DE); Christoph Pelchen, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 90 days.

(21) Appl. No.: 11/636,700

(22) Filed: Dec. 8, 2006

(65) Prior Publication Data

US 2007/0144808 A1 Jun. 28, 2007

(30) Foreign Application Priority Data

Dec. 9, 2005 (DE) .................. 10 2005 058 945

(51) Int. Cl.
*B60K 23/08* (2006.01)

(52) U.S. Cl. .............. 180/247; 180/233; 180/197

(58) Field of Classification Search ........... 180/197, 180/245, 6.2–6.7
See application file for complete search history.

(56) References Cited

U.S. PATENT DOCUMENTS

| | | | | |
|---|---|---|---|---|
| 5,220,975 | A * | 6/1993 | Zimmer et al. ........... | 180/197 |
| 5,341,893 | A * | 8/1994 | Fukui et al. ............. | 180/245 |
| 5,701,247 | A * | 12/1997 | Sasaki ................... | 701/1 |
| 5,810,335 | A | 9/1998 | Wirtz et al. | |
| 5,823,517 | A | 10/1998 | Huang et al. | |
| 5,913,802 | A * | 6/1999 | Mullet et al. ........... | 56/10.8 |
| 5,950,996 | A | 9/1999 | Pradel | |
| 6,361,123 | B1 * | 3/2002 | Hamilton .............. | 303/9.68 |
| 6,830,122 | B2 | 12/2004 | Kroppe | |
| 2005/0070391 | A1 | 3/2005 | Folsom et al. | |

FOREIGN PATENT DOCUMENTS

| | | |
|---|---|---|
| DE | 44 28 605 A1 | 4/1995 |
| DE | 195 29 580 A1 | 2/1997 |
| DE | 196 04 558 C1 | 8/1997 |
| DE | 196 06 991 A1 | 8/1997 |
| DE | 100 43 711 A1 | 5/2002 |
| DE | 102 27 416 A1 | 1/2004 |
| DE | 10 2004 009 113 A1 | 9/2004 |
| DE | 103 06 228 A1 | 9/2004 |
| JP | 04-129837 | 4/1992 |
| JP | 07-164926 | 6/1995 |

* cited by examiner

*Primary Examiner*—Lesley Morris
*Assistant Examiner*—Tashiana Adams
(74) *Attorney, Agent, or Firm*—Davis & Bujold, P.L.L.C.

(57) ABSTRACT

A method for operating a drive train of a vehicle with a drive engine, a brake system, at least two vehicle cross-shafts of a first vehicle axle with at least two wheels. The cross-shafts being actively connected via a transverse distributor gear and being driven by the engine. The vehicle also possibly having a second vehicle axle with at least two wheels. Frictional shift elements of the first vehicle axle, between the wheels of the first vehicle axle and the transverse distributor gear, are provided for variable distribution, to the first vehicle axle, of the fraction of the drive torque from the engine in the transverse direction of the vehicle between the two wheels. A desired yaw torque is determined. The drive engine, brake system and shift elements are controlled such that the desired yaw torque is produced essentially without changing the positive forward drive of the vehicle.

11 Claims, 2 Drawing Sheets

METHOD FOR OPERATING A DRIVE TRAIN OF A VEHICLE

This application claims priority from German Application Serial No. 10 2005 058945.6 filed Dec. 9, 2005.

FIELD OF THE INVENTION

The invention concerns a method for operating a drive train of a vehicle with a drive engine, with a brake system, with at least two vehicle cross-shafts of a first vehicle axle with at least two wheels, the cross-shafts being in active connection via a transverse distributor gear and being driven by the drive engine, and with a second vehicle axle with at least two wheels.

BACKGROUND OF THE INVENTION

To increase their maneuverability, vehicles known from engineering practice are built with so-termed torque-vector systems, by way of which a drive torque from a drive engine in a drive train can be distributed in a controlled manner in the area of a driven vehicle axle in the transverse direction of the vehicle between the drive wheels of a driven vehicle axle, for example, the front axle or a rear axle of the vehicle. This enables the yaw behavior of a vehicle to be influenced as necessary by an asymmetric distribution of the drive torque from the engine in the transverse direction of the vehicle as a function of the driving situation prevalent at the time.

To distribute the drive torque of an engine in the transverse direction of the vehicle between two wheels of a vehicle axle, torque-vector systems are used in the area of the vehicle axle, which are made as overlap gears. With overlap gears, it is possible, by way of appropriate mechanical means, to superimpose a torque difference over the mechanically predetermined symmetrical basic distribution, whereby a yaw torque can be imposed on the vehicle independently of the intrinsic drive torque of the vehicle. The result is that the steering of the vehicle round a curve can be supported, if necessary, or a yaw torque affecting the vehicle can be damped.

Such an overlap gear is known from US 2005/0070391 A1 in which the torque difference between the wheels of a driven vehicle axle can be adjusted by hydraulic means.

In general, however, overlap gears are of disadvantageously elaborate design, characterized by a large number of components and also taking up considerable structural space and having high intrinsic weight.

Alternatively, however, the drive torque in the area of a vehicle axle can be distributed in the transverse direction of the vehicle in accordance with the operating situation and symmetrically between the wheels, by way of so-termed clutch gears of simple design. In clutch gear systems, between a conventional transverse distributor gear and each wheel, a respective frictional shift element is arranged. To impose a desired yaw torque, the wheels are acted upon individually by a predefined fraction of the drive torque so that the degree of distribution of the drive torque in the transverse direction of the vehicle varies as a function of the respectively set transmission capacity of the shift elements.

However, such clutch gear systems have the disadvantage that the maximum yaw torque that can be produced to support the cornering of a vehicle depends on and is limited by the currently available drive torque from the engine.

Therefore, the purpose of the present invention is to provide a method for operating a vehicle drive train, by way of which the desired yaw torque can be produced with a clutch gear system of simple structure.

SUMMARY OF THE INVENTION

In the method according to the invention for operating a drive train of a vehicle with a drive engine, with a brake system, with at least two vehicle cross-shafts of a first vehicle axle with at least two wheels, the cross-shafts are in active connection, via a transverse distributor gear, and are driven by the engine and with a second vehicle axle with at least two wheels, such that in the area of the driven vehicle cross-shafts of the first vehicle axle, in each case between the wheels of the first axle and the transverse distributor gear, frictional shift elements for the variable distribution of the fraction of the engine's drive torque are provided which are transmitted to the first vehicle axle in the transverse direction of the vehicle between the two wheels, a desired yaw torque is determined and the engine; the brake system and the shift elements are controlled in such manner that the desired yaw torque is produced essentially without changing the positive forward drive of the vehicle.

The controlled, functional co-ordination of the frictional shift elements of the clutch gear system of the drive train, the drive engine and the brake system, in accordance with the invention, provides in a simple manner the possibility of producing the desired yaw torque in any driving situation without changing the positive forward drive of the vehicle and independently of the drive torque currently available.

Thus for example, to increase the maneuverability of a vehicle while driving around curve, it is possible to produce a desired yaw torque, which is called for by a superimposed operating strategy and which supports the cornering of the vehicle around the curve. The yaw torque is greater than a yaw torque that can be produced by virtue of the drive torque currently available by disengaging one shift element and engaging the other shift element of the first vehicle axle by increasing the drive torque from the engine and at the same time by braking the wheel associated with the disengaged shift element. In this way, a desired yaw torque currently called for can be produced by a clutch gear system of more simple design compared with mechanical overlap gear systems, independently of the drive torque currently available from a drive engine in a simple manner, and without changing the positive forward drive of the vehicle.

BRIEF DESCRIPTION OF THE DRAWINGS

The invention will now be described, by way of example, with reference to the accompanying drawings. For the sake of clarity, in the description of the various example embodiments the same indexes are used for components with the same structure and function. The drawing shows.

DETAILED DESCRIPTION OF THE INVENTION

Figure 1:
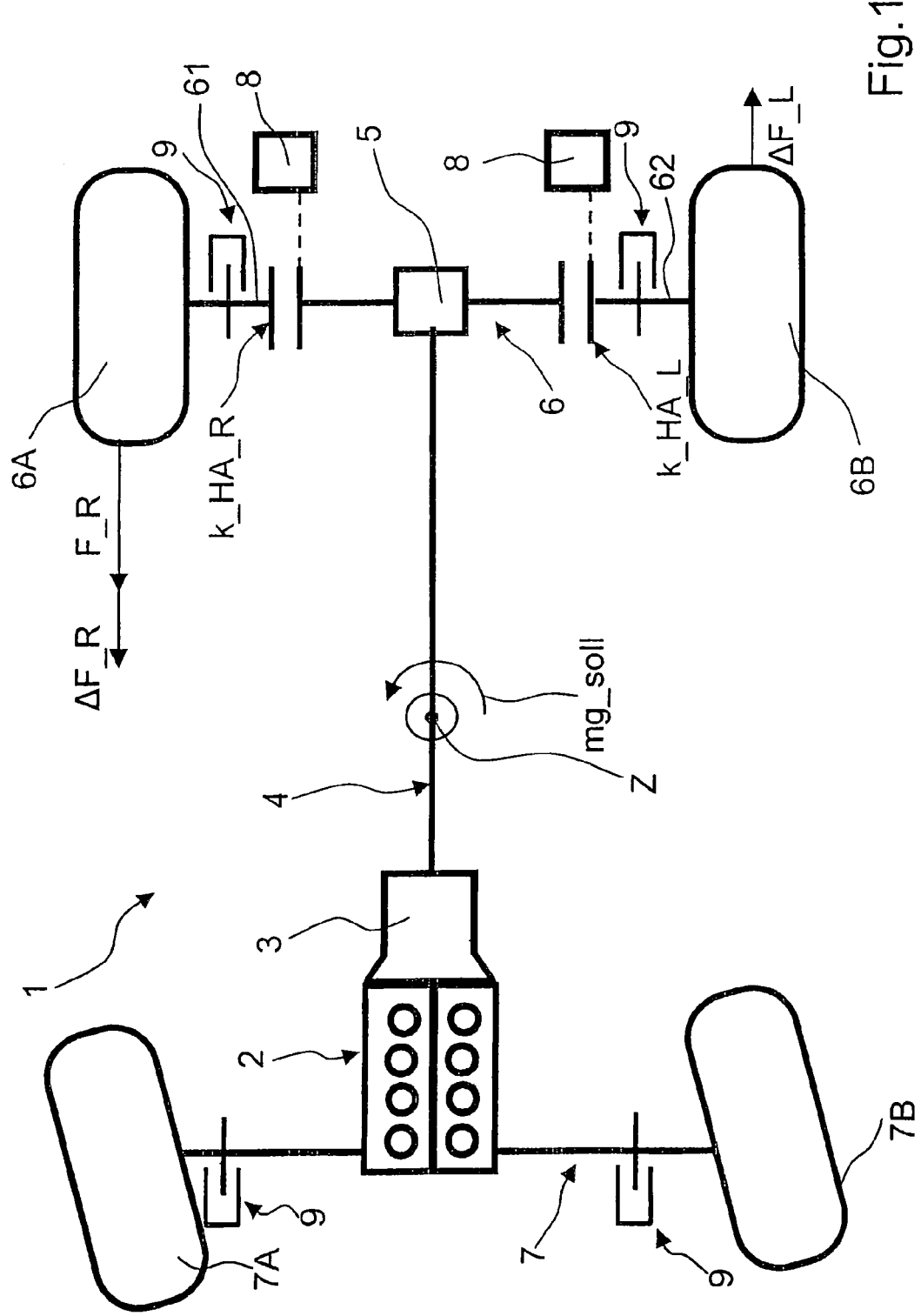
FIG. 1 is a schematic representation of a drive train in a rear-wheel vehicle.

FIG. 1 shows a drive train 1 of a rear-wheel drive vehicle schematically represented, which comprises a drive engine 2 and a main gearbox 3, where the main gearbox 3 can be any kind of transmission unit known as such from common practice. In the example embodiment illustrated in FIG. 1, the drive engine 2 is an internal combustion engine but, in an advantageous further development of the drive train 1, for example, can also be made as an electric motor.

Via a longitudinal shaft 4 of the vehicle, the main gearbox 3 is connected to a transverse distributor gear 5 of a first, driven vehicle axle 6, in this case the rear axle of the vehicle. The transverse distributor gear 5, in this case, consisting of an arrangement of two bevel gears meshing with one another (a manner not shown in further detail here), whereby the drive torque or transmission output torque of the main gearbox 3 transmitted via the vehicle's longitudinal shaft 4 in the longitudinal direction of the vehicle is then transmitted in the transverse direction of the vehicle towards the two wheels 6A and 6B of the first vehicle axle 6.

In addition, the transverse distributor gear 5 is in active connection with vehicle cross-shafts 61 and 62 of the first vehicle axle 6 that can be driven by the engine 2, and via which the transmission output torque from the main gearbox 3 transmitted via the vehicle's longitudinal shaft 4 can be transferred in the transverse direction of the vehicle to the wheels 6A and 6B.

Furthermore, in the area of the driven vehicle cross-shafts 61 and 62 of the first vehicle axle 6, two frictional shift elements k_HA_L and k_HA_R for the variable distribution are provided, respectively, between the wheels 6A and 6B of the first vehicle axle 6 and the transverse distributor gear 5 in the vehicle's transverse direction and, between the two wheels 6A and 6B, of the transmission output torque of the main gearbox 3 or of the drive torque from the engine transformed correspondingly by the transmission ratio of the main gearbox 3 and transmitted to the first vehicle axle.

The drive torque transmitted to the first vehicle axle 6 is distributed transversely by virtue of the variably adjustable transmission capacity of the two clutches k_HA_L and k_HA_R, preferably with one respective clutch k_HA_L or k_HA_R operated in the synchronous condition and the other respective clutch k_HA_R or k_HA_L operated in a slipping condition in order to keep power losses in the area of the shift elements as low as possible. In this way, depending on the transmission capacity of whichever of the clutches k_HA_L or k_HA_R of the first vehicle axle 6 is being operated in the slipping mode, the drive torque transmitted to the first vehicle axle 6 can be distributed transversely in a proportion of between 0% and 100% relating to one of the two wheels 6A or 6B.

In addition, the degree of transverse distribution of the drive torque in the vehicle's transverse direction is in such relationship with the control of the shift elements k_HA_L and k_HA_R that the drive torque is transmitted in a proportion of 100% to whichever drive wheel 6A or 6B is associated with the synchronously operated clutch k_HA_R or k_HA_L when the respective other clutch k_HA_L or k_HA_R of the vehicle cross-shaft 61 or 62 is operated with a transmission capacity reduced to the point where no torque is transmitted by that shift element.

In the present case, the two shift elements k_HA_L and k_HA_R of the drive train 1 are in the form of controlled and regulated frictional disk clutches whose transmission capacity is adjustable by way of an actuation system 8 known as such and not illustrated in any detail in FIG. 1. Thus, the use of the two shift elements k_HA_L and k_HA_R makes it possible to distribute a drive torque from the engine 2 or a transmission output torque of the main gearbox 3 in the vehicle's transverse direction between the two wheels 6A and 6B, variably and as necessary.

Furthermore, the drive train of a vehicle, schematically illustrated in FIG. 1, has a second vehicle axle 7. The steered front axle of the vehicle also has two wheels 7A and 7B. In the present case, the second vehicle axle 7 is not actively connected to the drive engine 2 and, therefore, cannot be acted upon by the drive torque from the drive engine 2.

Besides its drive train 1, the vehicle in FIG. 1, in a manner known as such, comprises a brake system 9 by way of which the vehicle can be braked in the area of each wheel 6A to 7B according to need and as a function of the driving situation at the time.

In the condition of the second vehicle axle 7, shown in FIG. 1, the wheels 7A and 7B are swiveled away from their position equivalent to starting off in a straight line so that the vehicle is cornering to the left. To increase the vehicle's maneuverability, in addition to the turning circle of the wheels of the second vehicle axle or front axle 7 of the vehicle, a desired yaw torque mg_soll that supports the turning of the vehicle around a vehicle axis Z, is call for by a superimposed operating strategy.

To produce the desired yaw torque mg_soll, the transmission capacities of the clutches k_HA_L and k_HA_R of the first vehicle axle or rear axle 6 of the vehicle are controlled in such a manner that the drive torque from the engine 2 in the transverse direction of the vehicle is distributed asymmetrically between the wheels 6A and 6B of the vehicle's rear axle 6 so as to produce a yaw torque that acts about the vertical axis Z of the vehicle and corresponds to the desired yaw torque mg_soll.

For this, the transmission capacity of the shift element k_HA_R required in order to produce the desired yaw torque mg_soll, with which the fraction of the drive torque from the engine 2 to be transmitted in the direction of the wheel 6A of the vehicle's rear axle 6 corresponds, can preferably be determined from the following mathematical relationship:

$$m(k\_HA\_R)=0.5 \cdot m\_mot \cdot i\_G \cdot i\_A + mg\_soll \cdot r\_dyn/2a$$

The transmission capacity of the shift element k_HA_L required in order to produce the desired yaw torque mg_soil, with which the fraction of the drive torque from the engine 2 to be transmitted towards the drive wheel 6B corresponds, can preferably be determined from the following mathematical relationship:

$$m(k\_HA\_L)=0.5 \cdot m\_mot, i\_G \cdot i\_A - mg\_soll \cdot r\_dyn/2a$$

If the desired yaw torque mg_soll called for by the superimposed operating strategy while driving round a bend increases, then to produce this desired yaw torque mg_soll the torque transmitted by the shift element k_HA_L is reduced still further until the maximum yaw torque that can be produced with the current drive torque is reached. The maximum yaw torque is obtained when the transmission capacity of the shift element k_HA_L has fallen essentially to zero and the entire drive torque is being transmitted via the shift element k_HA_R to the wheel 6A of the first vehicle axle 6.

The maximum obtainable desired yaw torque mg_soll_max, in fact, corresponds to that yaw torque which, in conventionally operating vehicles with clutch transmissions, can be produced by variable distribution of the drive torque in the vehicle's transverse direction between two wheels of a driven vehicle axle with a currently available drive torque from a drive engine and with no braking of the non-driven wheel 6A or 6B of the first vehicle axle 6.

But if the superimposed operating strategy calls for a desired yaw torque which is greater than the maximum obtainable yaw torque mg_soll_max, a difference between the desired yaw torque mg_soll called for and the said maximum yaw torque mg_soll_max is covered by the method, according to the invention, to be described later. The maximum desired yaw torque mg_soll_max is preferably determined from the following mathematical relationship:

$$mg\_soll\_max = m\_mot \cdot i\_G \cdot i\_A \cdot a / r\_dyn$$

To increase the maximum yaw torque mg_soll_max obtainable with the currently existing drive torque, the drive torque from the drive engine is first increased. Thereupon, in the area of the wheel 6A of the vehicle's rear axle 6 to which the full drive torque from the engine 2 or the full transmission output torque from the main gearbox 3, is transmitted to the wheel 6A via the shift element k_HA_R, a longitudinal force F_R is increased by an additional longitudinal force ΔDF_R. At the same time, braking is applied to the wheel 6B, which is decoupled from the drive engine 2 by virtue of the disengaged shift element k_HA_L, to produce a longitudinal force ΔDF_L of the same size as the additional longitudinal force ΔDF_R on the wheel 6A, but acting in the opposite direction. Owing to their same size but opposite action directions of the two longitudinal forces ΔDF_R and ΔDF_L acting in the area of the wheels 6A and 6B, those forces are neutral in relation to positive forward drive so that, by virtue of the operating action according to the invention, the required increase of the maximum desired yaw torque mg_soll_max is achieved with a constant drive force total.

An increase Δm_mot of the drive torque m_mot from the engine 2 can be determined from the following mathematical relationship:

$$\Delta m\_mot = \Delta mg \cdot r\_dyn / (2a \cdot i\_G \cdot i\_A)$$

The size of a braking action Δm_B can be determined from the following relationship formula:

$$\Delta m\_B = \Delta mg \cdot r\_dyn / 2a$$

In this formula, the variable Δmg corresponds to the difference between the actual desired yaw torque mg_soll called for and the maximum yaw torque mg_soll_max obtainable without increasing the drive torque m_mot of the drive engine. A variable i_G corresponds to the current overall transmission ratio engaged in the main gearbox 3, while a variable i_A is the transmission ratio of the transverse distributor gear 5. In the present case the variable a represents the track width of the vehicle's rear axle 6, while the dynamic wheel radius of the wheels 6A and 6B is taken into account in the calculation by a variable r_dyn.

Of course, the method, according to the invention corresponding to the procedure described above, can also be used in a front-wheel drive vehicle to obtain a desired yaw torque called for by a superimposed operating strategy to increase the maneuverability of the vehicle without affecting the positive forward drive of the vehicle.

In principle, the procedure described above assumes a drive train that is operating in traction. If the drive train 1 is operating in the thrust mode, a desired yaw torque mg_soll called for by the superimposed operating strategy is obtained by varying the transmission capacity of the two shift elements k_HA_L and k_HA_R, so long as the desired yaw torque mg_soll currently called for does not exceed the yaw torque mg_soll_max that can be obtained with the drive torque from the engine, i.e., the drive engine's thrust torque, available at the time. This means that the maximum available yaw torque mg_soll_max is obtained when all of the thrust torque from the drive engine 2 is transferred to the wheels 6A or 6B, whereas the other wheel 6B or 6A is effectively decoupled from the engine 2 by the disengaged shift element k_HA_L or k_HA_R that corresponds with it.

If the desired yaw torque mg_soll called for by the operating strategy exceeds the maximum obtainable yaw torque mg_soll_max, the drive engine 2 is powered up or the electric machine is converted from generator operation to motor operation, so that the drive train goes over from thrust operation into traction operation. At the same time, the transmission capacities of the shift elements k_HA_L and k_HA_R are changed in such a manner that the wheel 6A or 6B previously completely decoupled from the engine 2 now receives the full drive torque from the engine 2, since the drive wheel 6B or 6A to which the full thrust torque was previously delivered during thrust operation of the drive train is now completely decoupled from the engine 2 by disengaging the previously engaged shift element k_HA_L or k_HA_R. At the same time, the wheel 6A or 6B associated with the now disengaged shift element k_HA_R or k_HA_L is braked by corresponding brake actuation so that the desired yaw torque mg_soll about the vehicle's vertical axis Z currently called for is obtained without affecting the positive forward drive of the vehicle.

Figure 2:
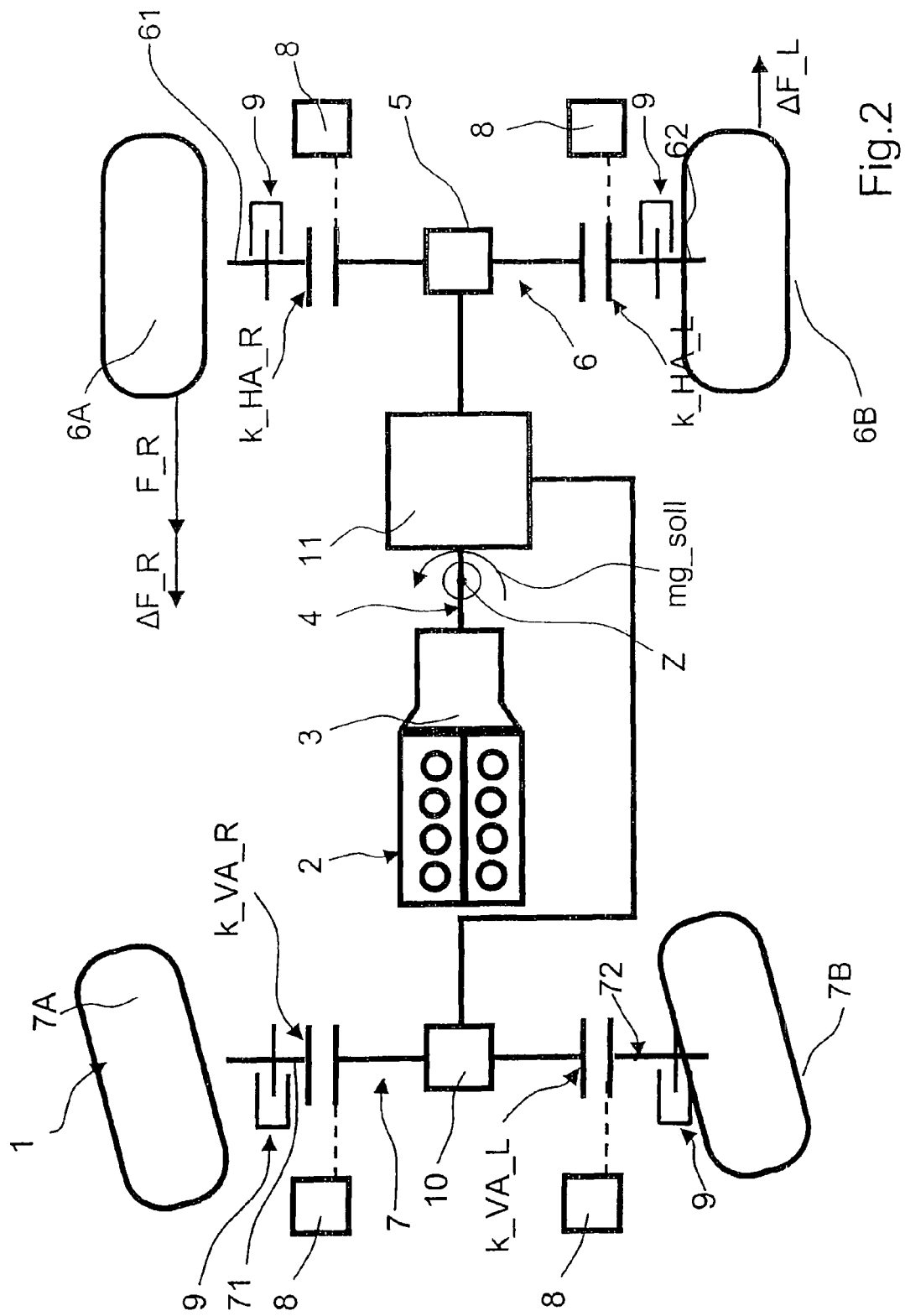
FIG. 2 is a representation corresponding to that of FIG. 1, of a drive train in an all-wheel-drive vehicle.

FIG. 2 shows the drive train 1 of an all-wheel drive vehicle in which the first vehicle axle 6 corresponds essentially to the driven first vehicle axle 6 shown in FIG. 1. In addition, in the same way as the first vehicle axle 6, the second vehicle axle 7, which constitutes the steered front axle of the all-wheel drive vehicle in FIG. 2, is provided in the area between a transverse distributor gear 10 and its wheels 7A and 7B, i.e., in the area of driven vehicle cross-shafts 71 and 72, with respective frictional shift elements k_VA_L and k_VA_R for the variable distribution between the wheels 7A and 7B of the fraction of the drive torque from the drive engine 2 delivered via a longitudinal distributor gear 11 to the second vehicle axle 7. The transverse distributor gear 10 of the second vehicle axle 7 is constructed in the same way as the transverse distributor gear 5 of the first vehicle axle.

This means that the drive train 1 of the all-wheel drive vehicle in FIG. 2 is configured both in the area of the vehicle's front axle 7 and in the area of the vehicle's rear axle 6 with respective frictional shift elements k_HA_L, k_HA_R or k_VA_L, k_VA_R between the respective transverse distributor gears 5 and 10 and the wheels 6A, 6B or 7A, 7B. This configuration of the drive train 1 of the all-wheel drive vehicle enables the drive torque from the engine 2 to be distributed variably in the transverse direction of the vehicle both in the area of the vehicle's front axle 7 between the wheels 7A and 7B and in the area of the rear axle between the wheels 6A and 6B. In addition, it is now also possible to distribute the drive torque from the engine 2 in the vehicle's longitudinal direction between the driven vehicle axles 6 and 7 with degrees of distribution between 0% and 100% as a function of the transmission capacities of the shift elements k_HA_L, k_HA_R and k_VA_L, k_VA_R.

This means that to produce a desired yaw torque mg_soll called for by the superimposed operating strategy, the drive torque m_mot from the drive engine 2 can be distributed in both the longitudinal and the transverse direction of the vehicle between the wheels 6A, 6B, 7A and 7B as the situation demands.

Basically, however, in an all-wheel drive vehicle as well, the procedure described earlier is again used when the desired yaw torque mg_soll called for exceeds the maximum yaw torque mg_soll_max obtainable with the drive torque available at the time. This means that the four shift elements k_HA_L, k_HA_R, k_VA_L and k_VA_R are controlled in such a manner that the drive torque from the engine 2 is delivered to only one drive wheel of the two vehicle axles. In addition, the drive torque is increased in the manner described earlier so that the driven wheel is driven with more power. At the same time, the wheel on the same axle as the driven wheel is braked by an amount equivalent to the increase of the drive torque from the engine 2, in order to produce the desired yaw torque called for. In this, here too the braking action is chosen such that the increased drive torque and the braking produce a result which is neutral in terms of positive forward drive.

REFERENCE NUMERALS

1 drive train
2 drive engine
3 main gearbox
4 longitudinal shaft of the vehicle
5 transverse distributor gear
6 first vehicle axle, rear axle of the vehicle
6A, 6B wheel
7 second vehicle axle, front axle of the vehicle
7A, 7B wheel
8 actuator system
9 brake system
10 transverse distributor gear
11 longitudinal distributor gear
61, 62 vehicle cross-shaft
71, 72 vehicle cross-shaft (still to be included in the description)
$\Delta F\_L$ longitudinal force
$F\_R$ longitudinal force
$\Delta F\_R$ longitudinal force
$k\_HA\_L$ shift element
$k\_HA\_R$ shift element
$k\_VA\_L$ shift element
$k\_VA\_R$ shift element
$mg\_soll$ desired yaw torque
$Z$ vertical axis of the vehicle

The invention claimed is:

1. A method of operating a drive train (1) of a vehicle with a drive engine (2), a brake system (9), and at least driven first and second cross-shafts (61, 62) of a first vehicle axle (6) with at least two wheels (6A, 6B), a transverse distributor gear (5) being driven by the engine (2) and the distributor gear (5) having first and second outputs, the first cross shaft (61) being connected to the first output of the distributor gear (5) and the second cross shaft (62) being connected to the second output of the distributor gear (5) such that the first and the second cross-shafts are actively connected to one another, the drive train (1) also having a second vehicle axle (7) with at least two wheels (7A, 7B), respective frictional shift elements (k_HA_L, k_HA_R) are provided, between the respective wheels (6A, 6B) of the first vehicle axle (6) and the respective first and the second outputs of the transverse distributor gear (5) for variable distribution of a fraction of a drive torque (m_mot) from the engine (2) in a transverse direction of the vehicle between the two wheels (6A, 6B) of the first vehicle axle (6), the frictional shift elements (k_HA_L, k_HA_R) being independent of each other and of the transverse distributor gear (5), the method comprising the steps of:

determining a desired yaw torque (mg_soll);
controlling the shift elements (k_HA_L, k_HA_R) to adjust the yaw torque to the desired yaw torque; and
controlling the drive engine (2) and the brake system (9) to achieve the desired yaw torque (mg_soll) essentially without changing a positive forward drive force of the vehicle and a transmission torque of one of the shift elements (k_HA_L, k_HA_R) is proportional to a transmission torque of an other of the shift elements (k_HA_L, k_HA_R).

2. The method according to claim 1, further comprising the step of obtaining the desired yaw torque (mg_soll) by varying the transmission capacity of the shift elements (k_HA_L, k_HA_R) such that a maximum yaw torque (mg_soll_max), obtainable with a current drive torque (m_mot) from the drive engine (2), is produced by engaging one of the shift elements (k_HA_L or k_HA_R) and, at the same time, disengaging another one of the shift elements (k_HA_R or k_HA_L) in an area of the first vehicle axle (6).

3. The method according to claim 2, further comprising the step of obtaining the desired yaw torque by additionally increasing the drive torque (m_mot) from the engine (2) and delivering a full fraction of the drive torque (m_mot) transmitted to the first axle (6) to one of the two wheels (6A or 6B) of the first vehicle axle, while another of the two wheels (6B or 6A) of the first vehicle axle (6) is braked by the brake system (9) such that the positive forward drive of the vehicle remains the same, if the desired yaw torque (mg_soll) called for is larger than a maximum yaw torque (mg_soll_max) obtainable with the current drive torque (m_mot) from the drive engine (2).

4. The method according to claim 3, further comprising the step of obtaining the desired yaw torque (mg_soll) during a thrust operation of the drive train (1) by varying transmission capacities of the shift elements (k_HA_L, k_HA_R) from one partial capacity to another partial capacity, until the full fraction of the engine drive torque (m_mot) is delivered to a first wheel (6A or 6B) of the first vehicle axle (6), the drive torque (m_mot) from the drive engine (2) is then increased and the drive train (1) brought into a traction operation, while the fraction of the drive torque (m_mot) delivered to the first vehicle axle (6) is transmitted in full to the second wheel (6B or 6A) of the first vehicle axle (6) by changing the transmission capacities of the shift elements (k_HA_L, k_HA_R), and the first wheel (6A or 6B) of the first vehicle axle (6) is braked.

5. The method according to claim 1, further comprising the step of transmitting a fraction of the drive torque (m_mot) from the drive engine (2) by a longitudinal distributor gear (11) to the second vehicle axle (7), while the first vehicle axle (6) is acted upon by a respective other fraction of the drive torque (m_mot).

6. The method according to claim 3, further comprising the step of obtaining the desired yaw torque (mg_soil) during a traction operation of the drive train (1) by varying transmission capacities of the shift elements (k_HA_L, k_HA_R) from one partial capacity to another partial capacity, until the full fraction of the drive torque (m_mot) delivered to the first vehicle axle (6) is transmitted to one of the two wheels (6A or 6B) of the vehicle axle (6), and the drive torque (m_mot) from the engine (2) is then increased while the other of the two wheel (6B or 6A) of the first vehicle axle (6) is braked.

7. The method according to claim 5, further comprising the step of variably distributing the fraction of the drive torque (m_mot) transmitted to the second vehicle axle (7) in the vehicle's transverse direction between the two wheels (7A, 7B) of the second vehicle axle (7) by way of two frictional shift elements (k_VA_L, k_VA_R) positioned respectively between the wheels (7A, 7B) of the second vehicle axle (7) and a transverse distributor gear (10).

8. A method of operating a drive train (1) of a vehicle with a drive engine (2), a transverse distributor gear (5) having first and second outputs, a first vehicle axle (6) having first and second driven cross-shafts (61, 62), each of the first and the second driven cross-shafts (61, 62) drive a wheel (6A, 6B) and include a frictional shift element (k_HA_L, k_HA_R) and a brake system (9), the drive engine (2) communicates with the transverse distributor gear (5) which transmits drive torque, via the first and the second outputs, to the first and the second driven cross-shafts (61, 62) to respectively drive each of the first and the second driven cross-shafts (61, 62), the frictional shift elements (k_HA_L, k_HA_R) are located respectively on the first and the second driven cross-shafts (61, 62) remote from the transverse distributor gear (5) centrally between the first and the second outputs of the distributor gear (5) and the respective wheel (6A, 6B), the method comprising the steps of:

determining a desired yaw torque (mg_soll);

controlling the frictional shift element (k_HA_R) of the first driven cross-shaft (61) to transmit a plurality of varying partial amounts of the drive torque to the associated wheel (6A) so as to produce a longitudinal force ($\Delta F\_R$) on the associated wheel (6A) and adjust a yaw torque to the desired yaw torque; and controlling the frictional shift element (k_HA_L) of the second driven cross-shaft (62) to transmit a plurality of varying partial amounts of the drive torque to the associated wheel (6B) so as to produce a longitudinal force ($\Delta F\_L$) on the associated wheel (6B) and adjust the yaw torque to the desired yaw torque, the varying partial amounts of drive torque transmitted by the frictional shift element (k_HA_R) of the first driven cross-shaft (61) is proportional to the varying partial amounts of the drive torque transmitted by the frictional shift element (k_HA_L) of the second driven cross-shaft (62) such that the yaw torque is adjusted to the desired yaw torque:

the longitudinal force ($\Delta F\_R$) produced on the wheel (6A) associated with the first driven cross-shaft (61) being of an essentially equal size as the longitudinal force ($\Delta F\_L$) produced on the wheel (6B) associated with the second driven cross-shaft (61), the longitudinal forces ($\Delta F\_R$, $\Delta F\_L$) produced on the respective wheels (6A, 6B) acting in opposite longitudinal directions, such that a combined longitudinal force (F_R) remains essentially constant.

9. A method of operating a drive train (1) of a vehicle with a drive engine (2), a transverse distributor gear (5) having first and second outputs, a first vehicle axle (6) having first and second driven cross-shafts (61, 62), the first and the second driven cross-shafts (61, 62) driving a respective first and second wheel (6A, 6B) and include a frictional shift element (k_HA_L, k_HA_R) and a brake system (9), the transverse distributor gear (5) communicates with the drive engine (2) and each of the first and the second driven cross-shafts (61, 62) to transmit drive torque from the drive engine (2) to each of the first and the second driven cross-shafts (61, 82), the frictional shift elements (k_HA_L, k_HA_R) are located respectively on the first and the second driven cross-shafts (61, 62) remote from the transverse distributor gear (5) and centrally between the first and the second outputs of the distributor gear (5) and the respective first and second wheels (6A, 6B), the method comprising the steps of:

determining a desired yaw torque (mg_soll);

partially disengaging the frictional shift element (k_HA_R) of the first driven cross-shaft (61) to transmit a fraction of the drive torque to the first wheel (6A) of the first driven cross-shaft (61) and partially engaging the frictional shift element (k_HA_L) of the second driven cross-shaft (62) to transmit a fraction of the drive torque to drive the second wheel (6B) to achieve the desired yaw torque (mg_soll), with a maximum yaw torque (mg_soll_max) being achieved when the frictional shift element (k_HA_R) of the first driven cross-shaft (61) is fully disengaged and the frictional shift element (k_HA_L) of the second driven cross-shaft (62) is fully engaged;

increasing the maximum yaw torque (mg_soll_max) while maintaining a constant forward drive force by partially engaging the brake (9) of the first driven cross-shaft (61) to decrease a forward drive force ($\Delta F\_R$) of the first wheel (6A) and increasing the drive from the drive engine (2) to the frictional shift element (k_HA_L) of the second driven cross-shaft (62) to increase a forward drive force ($\Delta F\_L$) of the second wheel (6B), and the decrease of the forward drive force ($\Delta F\_R$) of the first wheel (6A) being proportional to the increase of the forward drive force ($\Delta F\_L$) of the second wheel (6B) such that the forward drive force remains constant.

10. The method according to claim 9, further comprising the steps of variably distributing a portion of the drive torque (m_mot), which is transmitted from the drive engine (2), to third and fourth driven cross shafts (71, 72);

partially disengaging a frictional shift element (k_HA_R) of the third driven cross-shaft (71) to transmit a fraction of the portion of drive torque to a wheel (7A) of the third driven cross-shaft (71); and partially engaging a frictional shift element (k_HA_L) of the fourth driven cross-shaft (72) to transmit a fraction of the portion of drive torque to a wheel (7B) of the fourth driven shaft (72).

11. The method according to claim 9, further comprising the steps of:

partially disengaging the frictional shift element (k_HA_R) of the first driven cross-shaft (61) to transmit a fraction between 0% and 100% of the drive torque to the wheel (6A) of the first driven cross-shaft (61); and partially engaging the frictional shift element (k_HA_L) of the second driven cross-shaft (62) to transmit a fraction between 0% and 100% of the drive torque to drive the associated wheel (6B).

* * * * *